July 14, 1931.  N. LOMBARD  1,814,566
CLUTCH
Filed Aug. 16, 1929  2 Sheets-Sheet 1

Inventor
Nathaniel Lombard
By Attorneys
Southgate Fay & Harley

July 14, 1931.  N. LOMBARD  1,814,566
CLUTCH
Filed Aug. 16, 1929  2 Sheets-Sheet 2

Inventor
Nathaniel Lombard
By Attorneys
Southgate Fay & Hawley

Patented July 14, 1931

1,814,566

UNITED STATES PATENT OFFICE

NATHANIEL LOMBARD, OF WORCESTER, MASSACHUSETTS

CLUTCH

Application filed August 16, 1929. Serial No. 386,379.

The principal objects of this invention are to provide a clutch, without levers, springs, or other mechanical connections, which will act to bring a load up to speed gradually without causing the load on the motor or other prime mover to rise to an excessive point at any time during the operation; and to provide a clutch which will take hold gradually and evenly and yet consist of a minimum number of parts and having simplicity of construction throughout.

Other objects and advantages of the invention will appear hereinafter.

Reference is to be had to the accompanying drawings, in which

Figure 1:
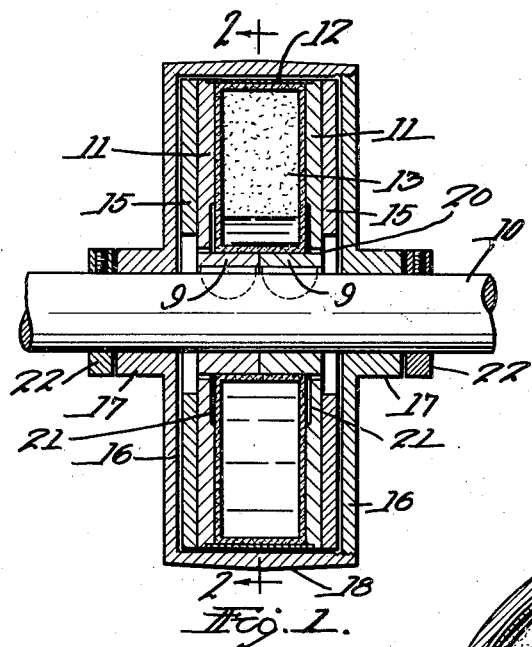
Fig. 1 is a diametrical sectional view of a clutch constructed in accordance with this invention, showing the clutch inactive.

This clutch is capable of use in many places and is of general application. It can be used with either portion connected with the prime mover, but I have shown it as having a driving shaft 10 to which are slidably keyed one or more discs 11, each having an integral hub 9 through which the shaft passes. These hubs are independently and slidably keyed to the driving shaft or one of them.

Surrounding the discs 11 is a cylindrical frame or casing 12 of metal. Inside the two discs 11 is an annular container 13 of rubber or other flexible material, and containing a body of liquid, as for example, water or oil.

Figure 2:
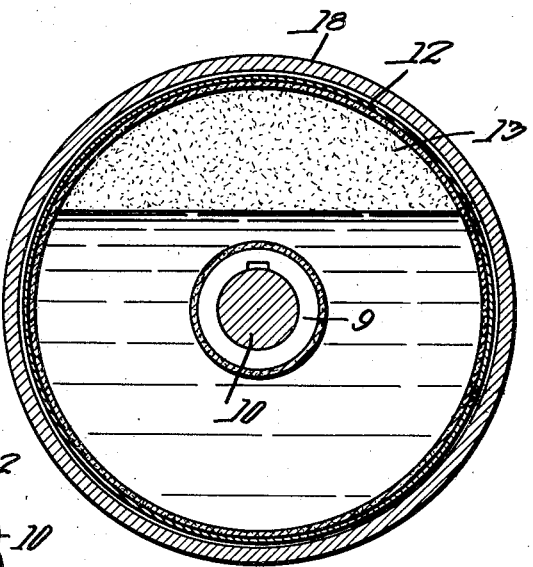
Fig. 2 is a sectional view on the line 2—2 of Fig. 1.
Figure 3:
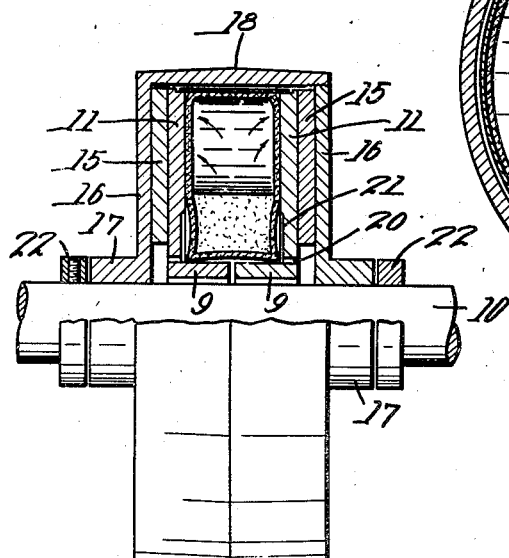
Fig. 3 is a side or edge view of the clutch partly in section, showing the condition when it is operating to transmit power to the load.
Figure 4:
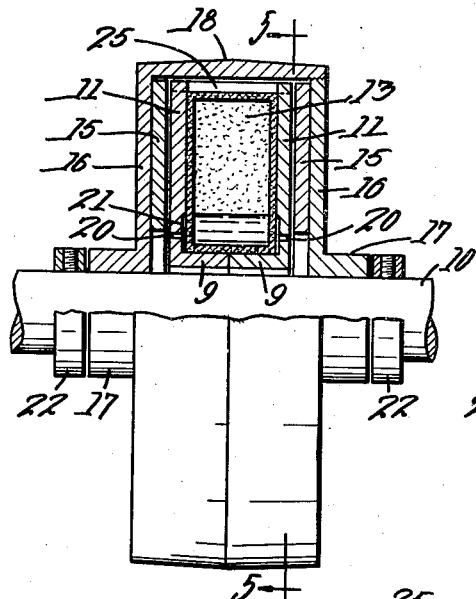
Fig. 4 is a view similar to Fig. 3, but in non-active condition, of a modified form of the clutch.
Figure 6:
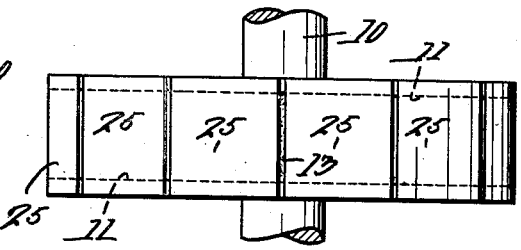
Fig. 6 is a plan of the expansible operating member of the clutch removed from the rest of the apparatus.
Figure 5:
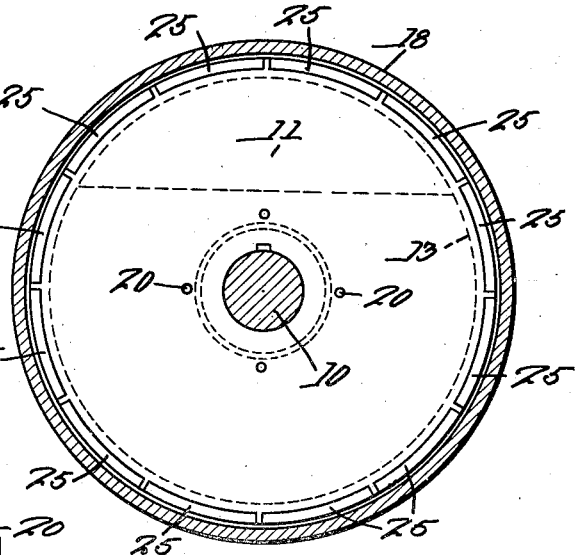
Fig. 5 is a sectional view on the line 5—5 of Fig. 4.
Figure 7:
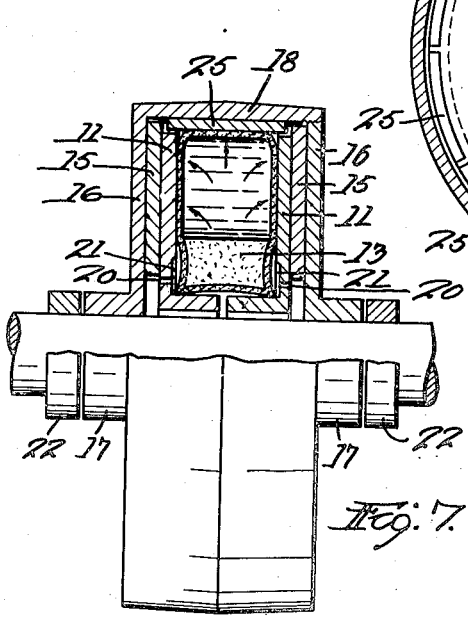
Fig. 7 is a view similar to Fig. 4, but showing the clutch in operation.

In Figs. 1 and 2 this liquid is shown up to a certain level, which, of course, it maintains when the driving shaft 10 is not rotating. Upon rotation this liquid will tend to be distributed by centrifugal force in an annular ring around the circumference of this container, as shown more particularly in Fig. 3. The effect of the pressure induced by centrifugal force is to force out the sides of this container, as indicated by the arrows in Fig. 3, and press apart the two discs 11, so that they will be forced away from each other along the shaft. Of course the discs and the rubber container rotate positively with the shaft. The casing 12 prevents the rubber container from expanding in an outward direction and confines the same to forcing the two discs apart.

In forcing the discs 11 apart, they will press against a pair of floating friction discs 15 which in turn press against the walls 16 of the casing of the clutch. These walls can transmit power to the hubs 17 from which it can be taken in any desired way, but I have shown in the drawings these discs as having connected with them a crowned cylindrical surface 18 which constitutes a pulley from which the power is transmitted. This pulley flange is shown as integral with one of the discs 16 and in screw-threaded connection with the other for adjustment.

For the purpose of venting the space around the inside of the container 13, I have shown perforations 20 through the discs 11 and grooves 21 on their inner faces, so that at all times air can enter and avoid the production of a vacuum here by the action of the clutch. I have shown collars 22 on the shaft 10 for preventing the shifting of the pulley thereon.

In the operation of this clutch it will be obvious that, as the motor starts or the shaft 10 is connected with it, no power will be transmitted to the pulley until the liquid in the clutch is distributed around the circumference thereof by centrifugal force, and that force is built up gradually to force the discs apart evenly and slowly and apply pressure to the friction discs and walls of the casing or pulley. It will also be obvious that the clutch will come into operation automatically and without any sudden or excessive strain on the parts and that the curve of the power used in throwing in the clutch will be of a comparatively flat nature instead of having an excessive rise in it near the start.

In the form shown in the second sheet of drawings, the same principles are involved with a single exception. The parts 9, 10, 11, 13, 15, 16, 17, 18, 20, 21 and 22 are the same as described before, but the ring or annular part that surrounds the rubber bag is shown as being made up of a plurality of sections 25. These sections are all movable radially, and therefore, the pressure of the rubber bag or container is exerted in a radial direction against the inside of the pulley flange 18 directly. This adds to the power of the clutch without detracting from its other advantages. These sections 25 are put in loose and spaced slightly apart and do not need any special guides. The advantages are substantially the same as in the other case, with the addition of the pressure against the circumferential flange of the pulley 18.

Although I have illustrated and described only two forms of the invention, it will be understood, of course, that this clutch does not have to be applied to a pulley, but can be used for transmitting motion between practically any kind of a driving and driven member, and that also, when used as a pulley, it can be reversed and the pulley can act as a driving member instead of a driven member by changes that will be obvious in view of the above description, without departing from the scope of the invention as expressed in the claims. Therefore I do not wish to be limited to the particular forms shown and described, but what I do claim is:—

1. In a clutch, the combination with a driving and driven member, of a flexible closed container having liquid therein, a pair of discs on opposite sides of the container engaging it and movable apart but rotatable by the driving member, a ring around the flexible container consisting of a series of separate segments, a casing having a circular surface against which said segments are adapted to bear, whereby upon the rotation of the driving member the liquid will be thrown out to the circumference of the container and will force said segments outwardly to apply pressure to said circular surface to assist it in driving the driven member, and will also force the sides outwardly for the same purpose.

2. In a clutch, the combination with a driving and driven member, of a flexible closed container having liquid therein and rotatable by the driving member, a ring around the flexible container consisting of a series of separate segments, a casing having a cylindrical surface against which said segments are adapted to bear, whereby upon the rotation of the driving member the liquid will be thrown out to the circumference of the container and will force said segments outwardly to apply pressure to said cylindrical surface to drive the driven member.

In testimony whereof I have hereunto affixed my signature.

NATHANIEL LOMBARD.